Patented Sept. 25, 1951

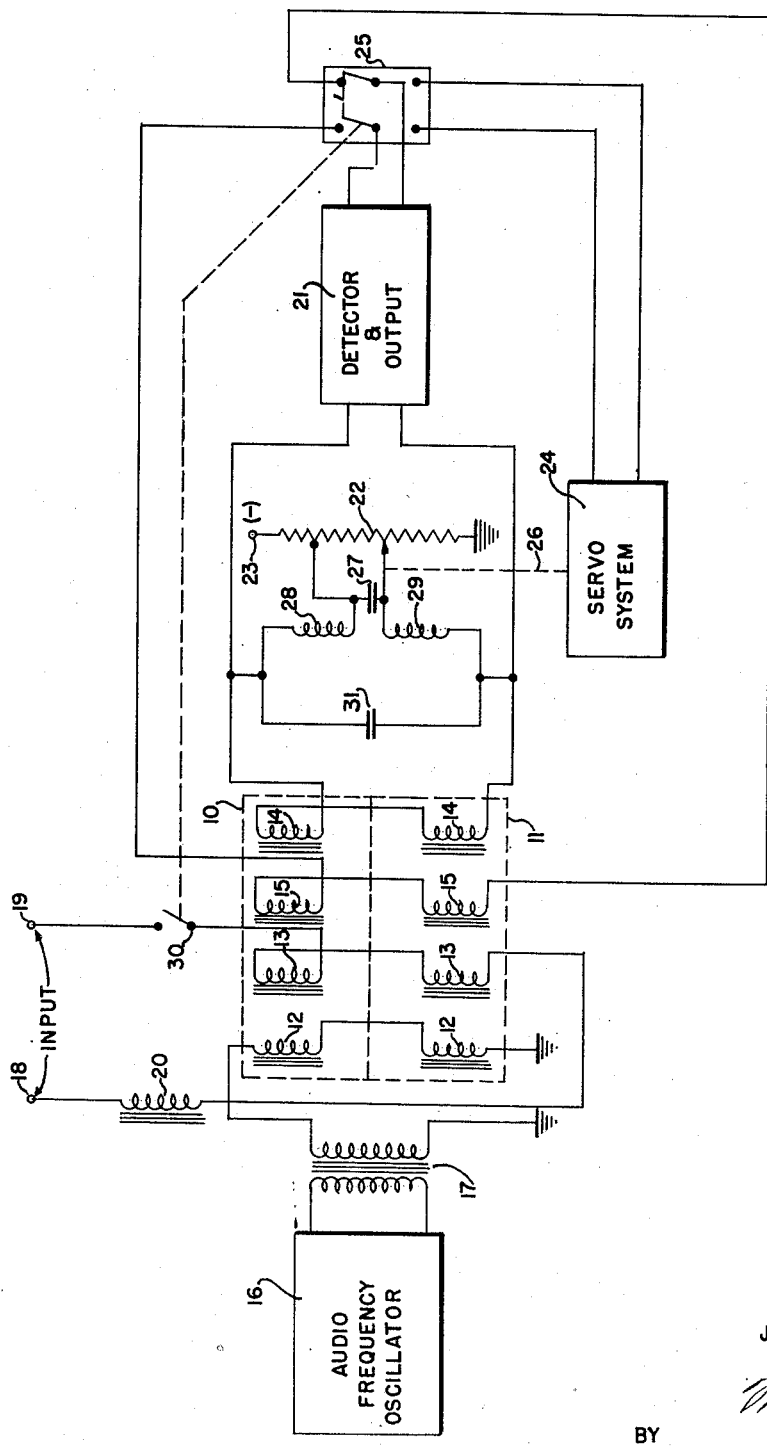

2,569,135

UNITED STATES PATENT OFFICE 2,569,135

ZERO ADJUSTMENT OF COMPUTERS

John W. Trischka, New York, and Henri S. Sack, Ithaca, N. Y., assignors to the United States of America as represented by the Secretary of the Navy Application July 10, 1946, Serial No. 682,614

9 Claims. (Cl. 235—61)

This invention relates to electrical computers, and more particularly to apparatus for automatically adjusting the zero of a computer using a magnetic amplifier.

The basic theory of the magnetic amplifier and a computer using the magnetic amplifier is treated fully in copending applications Serial Numbers 679,596 and 681,186, respectively, filed June 27, 1946 and July 3, 1946, respectively, each by Bruno Rossi, Henri S. Sack, Robert T. Beyer, and Glenn H. Miller. A brief summary of this operation is presented here to illustrate a particular need and application of the present invention. Essentially, a magnetic amplifier operates on the principle that when both alternating and direct magnetizing forces are applied to the primary winding of a transformer having a ferromagnetic core, even harmonics, principally the second harmonic of the applied alternating magnetizing force appear across the secondary of the transformers, the amplitude of the second harmonic, as a first approximation, being directly proportional to the magnitude of the current flowing in the primary winding due to the direct magnetizing force. In order to separate the even harmonics, and particularly the second, from the fundamental and odd harmonics, two identical transformers are used, the primary, or alternating current winding, the direct current windings, and the pick-up windings being so connected on the two cores that the fundamental cancels out across the two pick-up windings whereas the second harmonic due to the direct magnetizing force will add. The second harmonic output of the secondary is then detected and amplified and used as a measure of the direct current in the aforementioned direct current windings. For greater stability the rectified output is fed back through a fourth or compensating winding on the transformer. The feedback current is thus an amplified measure of the current in the direct current windings. The amplifier is converted to a computer by adding more direct current windings to the transformers, whereby the compensation or feedback current is proportional to the algebraic addition of the currents in the direct current windings.

For application of the aforementioned computer in radar systems, for example, it is often important that operation be continued over an extended period of time, without adjustment, which means that the long-time stability of the device must be of the same order as the desired precision. The long-time stability is dependent upon a number of factors such as fluctuation in the transformers, tube drift and external conditions, such as temperature, power supply, vibration, etc. Fluctuations in the detector and feedback circuits do not have much effect on the output current since the negative feedback arrangement tends to compensate for the change. However, fluctuations within the non-linear transformers are more serious. It has been observed that within transformers a small second harmonic output signal exists, even if the input currents are zero. This gives rise to a finite compensation current which constitutes a zero error. It has also been borne out that the magnitude of this residual second harmonic is not constant, thereby making the correction problem more difficult.

Accordingly, it is the primary object of this invention to provide a method of compensation for errors in a computer using a magnetic amplifier.

A further object of the present invention is to provide an automatic method of improving the long-time stability of a computer using a magnetic amplifier.

Another object of the present invention is to provide automatic compensation for the fluctuations inherent in the non-linear transformers of a magnetic amplifier.

A still further object of the present invention is to provide automatic compensation for errors caused by conditions external to a magnetic amplifier, such as temperature and vibration.

The foregoing and other objects will be apparent from the detailed description when taken with the accompanying drawing which is a schematic circuit diagram showing one embodiment of the present invention in combination with a magnetic amplifier.

Referring to the drawing, the basis of the magnetic amplifier lies in the characteristics of non-linear transformers 10 and 11, the two transformers being connected as shown. In the basic amplifier circuit, the transformers are wound with primary windings 12, secondary direct magnetizing or D. C. bias windings 13, pick-up windings 14, and for added sensitivity and stability, a compensation winding 15. An alternating voltage of constant frequency and sufficient amplitude to cause operation of the transformers in their saturation region is applied to primary windings 12 of transformers 10 and 11 from audio frequency oscillator 16 through matching transformer 17. The direct magnetizing force necessary for operation is produced by a direct current flowing through input windings 13, applied thereto at input terminals 18 and 19. A choke coil 20 is inserted in series with windings 13 to minimize the influence of input impedance fluctuations. For computer applications of this amplifier additional input windings (not shown), identical to the one above described and shown, are added to transformers 10 and 11, the number added being equal to the number of currents or potentials it is desired to add. With pick-up windings 14 connected as shown, the second harmonic of the applied alternating voltage appears at their output terminals. This output is applied to phase-sensitive detector and output circuit 21, where the alternating voltage is rectified and fed back through compensation windings 15 in such a way that the current flow opposes the effect of the direct current in secondary windings 13. The magnitude of the compensating current is then a measure of the algebraic sum of the currents in the input windings.

The zero current error mentioned above results from irregularities in transformers 10 and 11, tube drift in detector and output circuit 21, and conditions of temperature, vibration and the like external to the circuit. To overcome the difficulties due to these variations and the long-time instability of the circuit caused by them, zero correction is provided for the circuit shown, automatically whenever it is needed. In accordance with this invention, the zero current is compensated for by superimposing an additional current in one of the windings of transformer 10 and 11, the magnitude of this current being of such a value that it compensates for the residual second harmonic output and any unbalancing in the detector or output stages. As illustrated on the drawing, the additional bias current is applied to pick-up windings 14 as shown in the sketch, the magnitude of the current being dependent upon the relative positions of the taps on potentiometer 22, the latter being connected in series with a source of negative direct voltage between terminal 23 and ground. The proper location of the movable contact of potentiometer 22 is determined automatically by using a servo system 24. The output of detector 21 can be connected by switch 25 to either feedback winding 15 or to servomotor 24. When switch 25 is thrown to the servo position, then the feedback circuit is opened and at the same time the input circuits are opened by switch 30 ganged to switch 25. Under these conditions, the motor of servo system 24 will operate, driving the movable arm of potentiometer 22 by shaft 26, until the correction current through windings 14 compensate the residual second harmonic output of transformers 10 and 11. When the zero current correction has been made switches 25 and 30 are thrown back to connect the output circuit 21 to compensating windings 15, the input circuits to windings 13 are closed, and the circuit continues its normal operation. The operation of switch 25 and switch 30 in the input circuit may be automatic if desired so that correction current will be applied at definite, predetermined time intervals, or at such time that correction is needed as indicated by an erratic change in the current in windings 15. In addition to compensating for errors, this arrangement automatically adjusts the circuit for tube changes in the detector and output stages. Condenser 27 is an isolating condenser, and inductances 28 and 29 together with condenser 31 form a tuned tank circuit resonant to the frequency of the output of windings 14.

It will be apparent to those skilled in the art that the compensation current may be applied in other ways and to other of the transformer windings. Accordingly, the foregoing specification should not be construed as a definition of the invention, but merely illustrative of one form the invention may take.

What is claimed is:

1. In a computer using a magnetic amplifier having two non-linear transformers each having a direct current magnetizing winding, and a pick up winding, and a detector and output circuit, a zero adjustment device comprising, a servo system, switching means connected in said output circuit and arranged simultaneously to open said magnetizing winding and to connect said output circuit to said servo system, and an adjustable voltage source connected to the terminals of said pick-up windings, said servo system being responsive to the output of said output circuit for adjusting said voltage source to reduce the output of said output circuit to zero.

2. In a computer using a magnetic amplifier having two non-linear transformers each having a direct current magnetizing winding, a pick-up winding and a compensation winding, and a detector and output circuit, said output circuit being normally connected to said compensation windings, a zero adjustment device comprising, a servo system, switching means connected in said output circuit and arranged simultaneously to open said magnetizing winding, disconnect said output circuit from said compensation windings, and connect said output circuit to said servo system, and an adjustable voltage source connected to the terminals of said pick-up windings, said servo system being operative in response to the output of said output circuit for adjusting said voltage source to reduce the output of said output circuit to zero.

3. In a computer using a magnetic amplifier having two non-linear transformers, each of said transformers including a direct current magnetizing winding, a pick-up winding, and a compensation winding, a detector and an output circuit associated with said magnetic amplifier, said magnetizing winding being normally energized by an input signal, said output circuit being normally connected to said compensation windings, apparatus associated with said computer for providing a zero adjustment thereof comprising, a servo system, switching means connected in said output circuit and arranged simultaneously to remove said input signal from said magnetizing winding, to disconnect said output circuit from said compensation windings and to connect said output circuit to said servo system, and an adjustable voltage source connected to the terminals of said compensation winding, said servo system being responsive to the output of said output circuit in the absence of a magnetizing signal for adjusting said voltage source to apply a correction current to said compensation winding to reduce the output of said output circuit to zero.

4. In combination with a computer utilizing a magnetic amplifier having means for coupling thereto a magnetizing signal and an output circuit, apparatus for providing zero adjustment of said computer comprising a voltage source being adjustable in value under control of a servo system, said voltage source being coupled to said computer, and switching means arranged simultaneously to remove said magnetizing signal and to connect said output circuit to said servo system.

5. In a computer utilizing a magnetic amplifier having a plurality of windings including a direct current magnetizing circuit and an output circuit normally connected back to said computer, apparatus for providing zero adjustment of said computer comprising, switching means arranged simultaneously to open said magnetizing circuit and to disconnect said output circuit from said computer, and means connected to said switching means responsive to the output of said output circuit for superimposing a current in one of said plurality of windings to reduce the output of said output circuit to zero.

6. In a computer utilizing a magnetic amplifier having a plurality of windings including a direct current magnetizing winding and a compensating winding, and an output circuit normally coupled to said compensating winding, apparatus for providing zero adjustment of said computer comprising, a servo system, switching means arranged simultaneously to open said magnetizing winding and to transfer the output of said output circuit from said compensating winding to said servo system, and means operative by said servo system for superimposing a current in one of said plurality of windings to reduce the output of said output circuit to zero.

7. In a computer utilizing a magnetic amplifier having a direct current magnetizing circuit, a compensating circuit, and an output circuit, said output circuit being normally connected to said compensating circuit, apparatus for providing zero adjustment for said computer comprising, switching means arranged simultaneously to open said magnetizing circuit and to disconnect said output circuit from said compensating circuit, and means responsive to the output of said output circuit in the absence of a direct current magnetizing signal for superimposing a current in one of the windings of said magnetic amplifier of magnitude sufficient to reduce the output of said output circuit to zero.

8. A computer utilizing a magnetic amplifier having a direct current magnetizing circuit and an output circuit, a servo system, switching means connected in said output circuit being arranged simultaneously to open said magnetizing circuit and to connect said output circuit to said servo system, and an adjustable voltage source coupled to said computer, said servo system being responsive to the output of said output circuit for adjusting said voltage source to reduce the output of said output circuit to zero.

9. In circuit with a magnetic amplifier computer including a pair of magnetic cores, each having wound therein an alternating current winding, a direct current magnetizing winding, a pick-up winding, and a compensating winding, and an output circuit coupled to said pick-up windings, said output circuit being normally connected to said compensating windings, a zero adjustment device comprising, a servo system, switching means arranged simultaneously to open said magnetizing winding and to disconnect said output circuit from said compensating windings and to connect it to said servo system, and an adjustable voltage source connected across said pick-up windings and being mechanically adjustable by said servo system, said servo system being operative in response to the output of said output circuit to adjust the current in said pick-up windings to reduce the output of said output circuit to zero.

JOHN W. TRISCHKA.
HENRI S. SACK.

REFERENCES CITED

The following references are of record in the file of this patent:

UNITED STATES PATENTS

| Number | Name | Date |
| --- | --- | --- |
| 2,208,623 | Bond | July 23, 1940 |